Oct. 2, 1923.
S. HATASHITA
REAR AXLE AND WHEEL
Filed Feb. 4, 1921
1,469,593
3 Sheets-Sheet 1
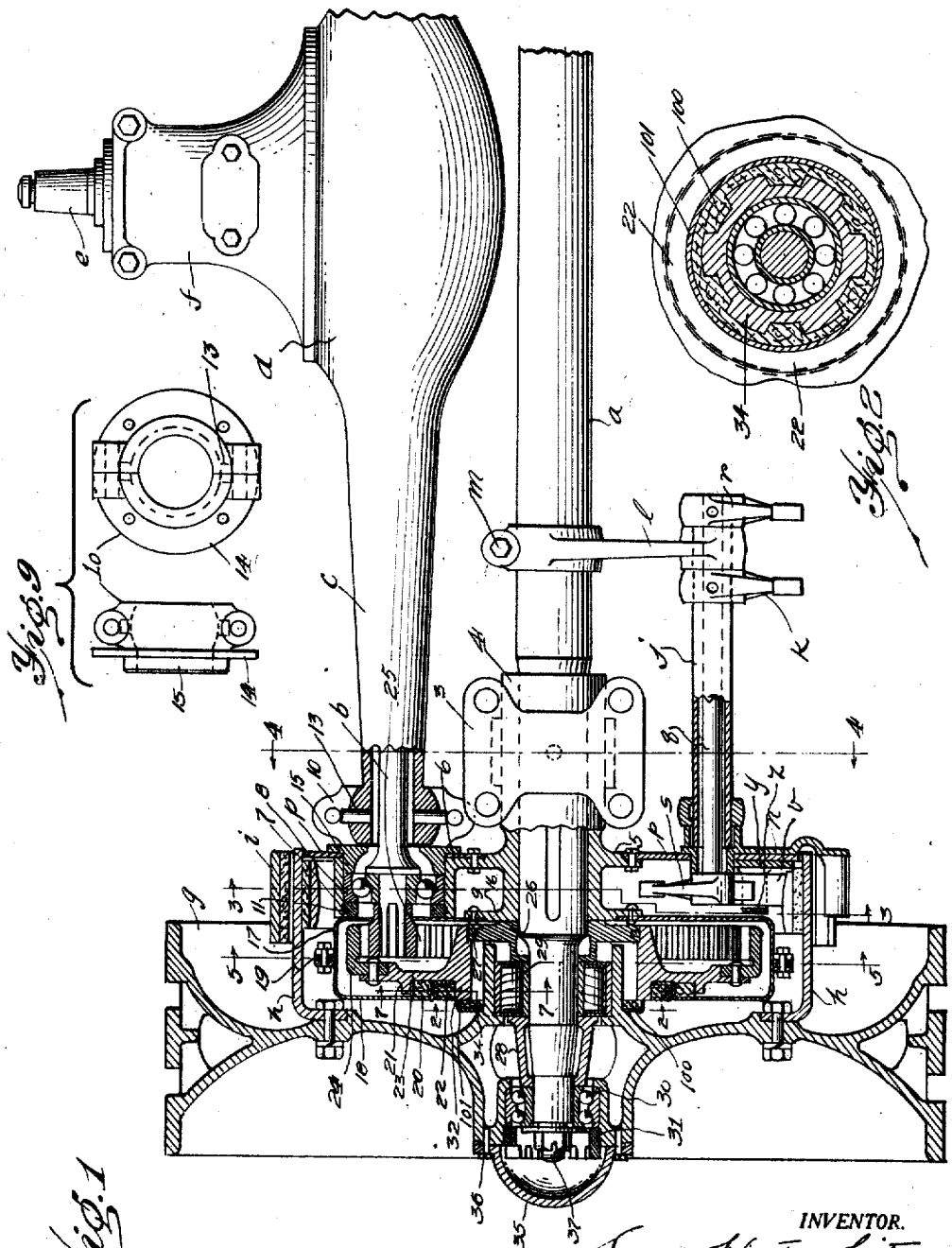

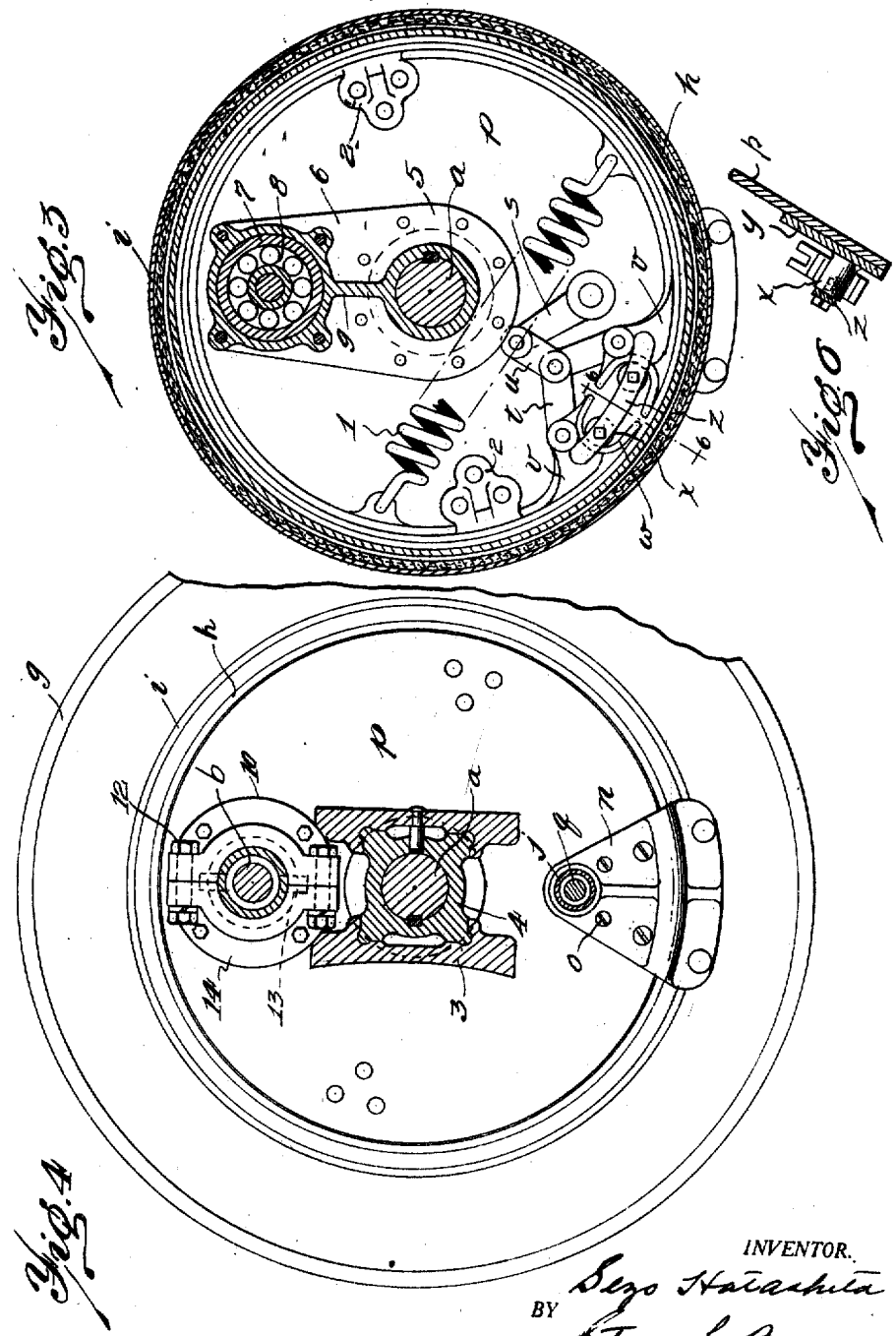

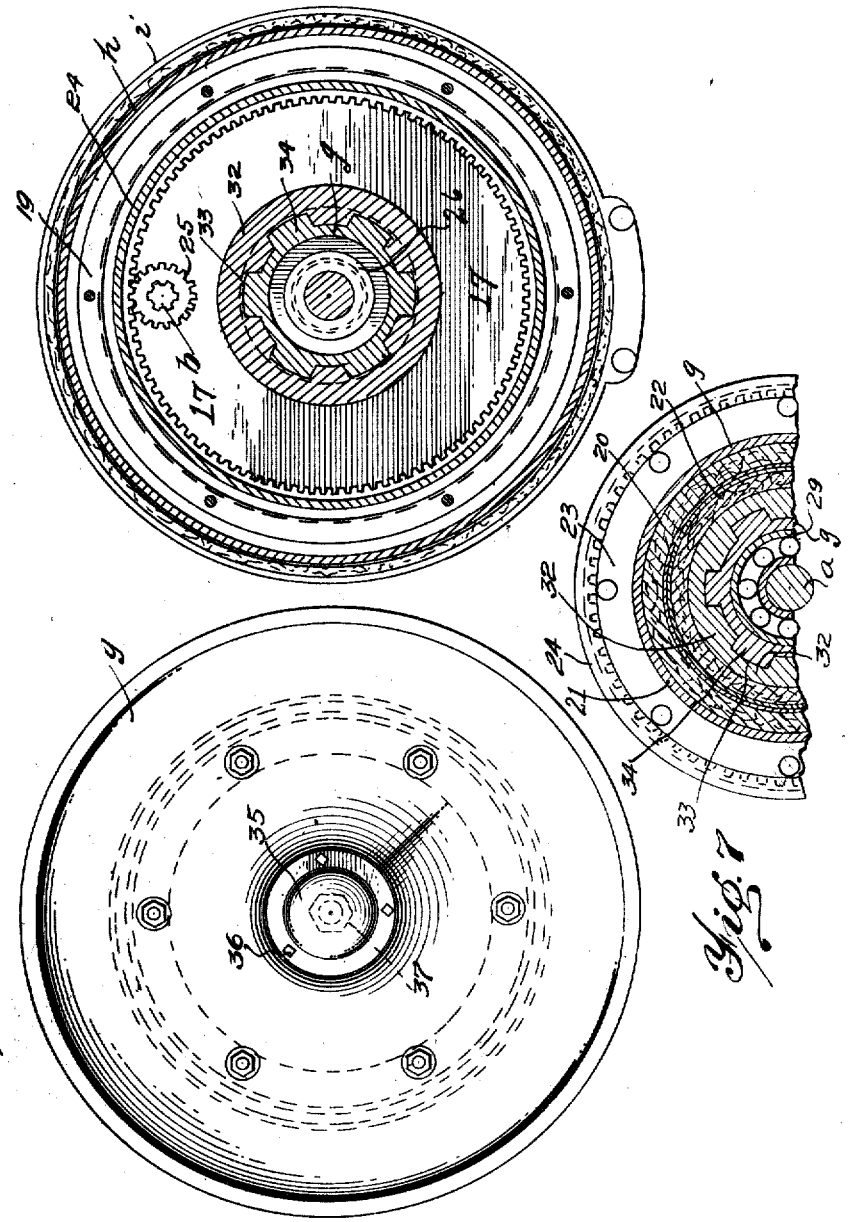

Patented Oct. 2, 1923.

1,469,593

UNITED STATES PATENT OFFICE.

SEZO HATASHITA, OF DETROIT, MICHIGAN.

REAR AXLE AND WHEEL.

Application filed February 4, 1921. Serial No. 442,442.

*To all whom it may concern:*

Be it known that I, SEZO HATASHITA, a subject of the Emperor of Japan, residing at Detroit, in the county of Wayne and State of Michigan, have invented certain new and useful Improvements in Rear Axles and Wheels, of which the following is a specification.

This invention relates to rear axles and wheels for heavy duty automobiles, trucks and tractors. It is the object of the present invention to provide a suitable assembly in that type of a driving wheel which is driven through a separate jack shaft and an internal gear. The parts are so designed as to make the disassembly of the wheel and the internal gear comparatively easy while at the same time providing suitable dust collars and oil retaining cups and packing.

A further feature of this assembly is an arrangement of the parts in such a way that an internal brake is afforded. These and other objects will be best understood after the detailed construction is explained.

In the drawings,—

Fig. 1 is a combined plan view and horizontal cross section through a part of the rear axle and rear wheel.

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a section on the line 5—5 of Fig. 1.

Fig. 6 is a section on the line 6—6 of Fig. 3.

Fig. 7 is a section on the line 7—7 of Fig. 1.

Fig. 8 is an elevation of the tractor wheel.

Fig. 9 shows two elevations of the jack shaft clamp.

*a* designates the dead axle; *b* the jack shaft; *c* the jack shaft housing expanding out at the center to form a differential case *d*. *e* represents a coupling for the propeller shaft; *f* the forward portion of the differential case, in which is contained the driving gear. *g* designates the rear traction wheel which is here shown to be a cast iron wheel for a tractor and which obviously might be of almost any construction and yet embody the improvements now to be described. Bolted to this wheel is a brake drum *h* on the exterior surface of which operates the external contracting brake *i*. This being no part of the present invention, the details of the operating connections are omitted. Suffice it to say that the same is operated by the brake lever *k* and the sleeve *j* (Fig. 1).

This sleeve is supported on the arm *l* clamped at *m* to the dead axle *a*. The inner end of the sleeve *j* is supported by a bracket *n* fastened by screws *o* to the dust plate *p* (Fig. 4). A rod *q* runs from the brake lever *r* through the sleeve *j* and connects with the brake lever *s* contained within the dust plate and brake drum. Now referring to Fig. 3, it will be seen that this lever *s* operates the toggle arms *t* through the link *u* and tends to straighten the toggle arms in applying the brake and consequently forces the brake strap heads *v*, *v* against the inside of the brake drum *h*. Each of these heads *v* is provided with a half circular recess *w* in which engage the studs *x* secured on the plate *y*. The strap *z* is bolted to the ends of the studs. The plate *y*, studs *x* and strap *z* form a spacer and guide for the brake straps and prevent the toggle arms collapsing under the influence of the tractile spring 1 any further than indicated in Fig. 3. The brake straps are riveted to the dust plate *p* by the lugs 2.

This internal brake construction is made possible in an assembly of this type by reason of the construction now to be described. The spring pad is designated 3. This is carried on a casting or supporting member which has several functions and is important. This casting or supporting member 4 not only supports the spring pad 3 but is provided with an inner annular flange 5, to which is bolted the dust plate *p*, which together with the brake drum *h* houses the internal or expanding brake. This same flange 5 is provided with an extending part or arm 6 which journals the jack shaft. To this end the arm is provided with a boss or a sleeve 7 on its end forming a comparatively long bearing housing in which may be contained the ball bearing cage 8. A web 9 reinforces the sleeve 7. The ball bearing cage 8 is secured between the clamp 10 on the end of the axle housing *c* and the spanner nut 11. This clamp 10 is possibly best understood from Figs. 4 and 9. It comprises a pair of half ring sections having lugs at either side that may be clamped together by the bolts 12. A torque pin 13 may be clamped in between the sections. One of the sections is provided with an integral annular flange portion 14 which may be bolted to the dust plate $p$, also with an inwardly-projecting sleeve portion 15 that forms the abutment for the bearing cage.

The supporting member 4 is provided with an outer annular flange 16 which has riveted to it the oil cup section 17. This oil cup section is adapted to mate with the outer oil cup section 18 by means of the flanges 19 that are bolted together. This outer oil cup section is pressed in at the center to form a seat for the packing ring 20 that abuts against the ring 21 molded in the internal gear web. A further packing 22 with a metal retaining ring is pressed in the depressed center portion of the outer oil cup 18. This insures adequate provision against oil being thrown out at this point. The internal gear is made up of a web 23 to which is riveted the ring gear 24 having internal teeth. These internal teeth mesh with the pinion 25 which is splined on the end of the jack shaft $b$. 26 designates a spacing ring having a groove in its outer surface to carry the packing ring 27. 28 designates a spacing cone between the main roller bearings 29 and the ball bearings 30 which are carried on the end of the dead axle and are held in place by the spanner nut 31.

The web of the internal gear is provided with a hub 32 provided with a splined groove 33 adapted to fit over the spine 34 on the hub of the wheel $g$.

The method of disassembling or assembling the wheel can now be understood. The hub cap 35 is secured to the end of the wheel hub by the screws 36. All that is necessary is to take off this hub cap and remove the castellated nut 37 from the end of the dead axle together with its washer. The wheel will now come off, probably carrying with it the roller bearings 29 or possibly leaving those on the axle, depending upon the grease cohesion. This gives access to the inside of the external brake and also gives access to the internal or expanding brake and all its connections. The brake linings may be renewed or any other repairs made on the brakes without in any way interfering with the internal gear drive or using any of the oil contained in the driving parts for this is tightly held in place by the two-section oil cup. If it is desired to get to the gear, this may be accomplished simply by removing the outer oil cup section 18 which permits the large gear to be pulled out of mesh with the driving pinion.

What I claim is:

1. In an assembly for the purpose specified, the combination of a dead axle, a traction wheel secured to rotate thereon, a supporting member secured on said dead axle and having a laterally-extending arm having an opening therethrough, a jack shaft housing provided with an enlarged end, a two part clamp for removably clamping said jack shaft housing to the said arm in alignment with the opening through said arm, said two parts of the clamp being detachably but rigidly connected to the arm and clamping over the enlarged end of the jack shaft housing and a jack shaft within the jack shaft housing and passing through and supported in the opening in said arm and in driving connection with the traction wheel.

2. In an assembly for the purpose specified, the combination of a dead axle, a supporting member secured thereto provided with a laterally-extending arm having an opening therethrough, a jack shaft housing, and a two-part clamp securable to the end of the jack shaft housing and provided with portions adapted to rest in the opening of the said arm and be secured to said arm, a jack shaft passing through said jack shaft housing and rotatably supported within the opening in the arm, and a traction wheel rotatably supported upon the dead axle and in removable driving relation with the said jack shaft.

3. In an assembly for the purpose specified, the combination of a dead axle, a traction wheel having a hub and a brake drum and rotatable upon the dead axle, a supporting member provided with a sleeve fitting over the dead axle and an annular flange provided with an arm having an opening therethrough, a jack shaft housing detachably securable to said arm and in alignment with the opening, the said supporting member provided with an outer or second flange, an oil cup section secured to the said second flange, and a driven gear removably splined onto the hub of the traction wheel, an outer cup section removably secured to the inner cup section and over the driven gear, a jack shaft passing through the jack shaft housing and rotatably supported in the opening in the said arm, and a driving pinion on the end of the live axle meshing with the teeth of the driven gear.

4. In an assembly for the purpose specified, the combination of a dead axle, a traction wheel rotatable thereoen, a supporting member having a sleeve secured thereon and provided with an annular flange merging into an arm having an opening therethrough, a jack shaft housing removably securable to said arm in alignment with said opening, the said supporting member being provided with a second or outer flange, an oil cup section secured to the said second flange, a driven gear in splined relation with respect to the hub of the traction wheel so as to be disengageable therefrom, an outer oil cup section secured to the inner oil cup section and about the driven gear and for holding the same in place, a jack shaft contained in the jack shaft housing and rotatably supported in the opening in the arm, a driving pinion on the end of the jack shaft meshing with the driven gear, a brake drum secured to the said traction wheel and enclosing the oil cup housing and extending inwardly beyond the same over the space included between the two flanges of the supporting member, and an internal brake contained in said space on the inside of the oil cup member.

5. In an assembly for the purpose specified, the combination of a dead axle, a traction wheel rotatable upon the end of the dead axle and having a brake drum attached thereto, said traction wheel provided with a splined hub, a casting secured to the dead axle and comprising a sleeve having an outer and inner flange, a jack shaft housing supported by the inner flange, a dust plate fitting in the brake drum opening and supported by the inner flange, an oil cup section supported by the outer flange, a driven gear splined removably on the traction wheel hub, an outer oil cup section bolted to the inner oil cup section and holding the driven gear in place, a jack shaft contained within the jack shaft housing and rotatably supported upon the inner flange, and a driving pinion on the end of the jack shaft meshing with the teeth of the driven gear.

6. In an assembly for the purpose specified, the combination of a dead axle, a traction wheel rotatable thereon and provided with a brake drum, a casting in the form of a spring pad supporting sleeve secured to the dead axle and having an outer flange and an inner flange, a jack shaft rotatably supported by the inner flange, a two-section oil cup supported by the outer flange, a driven gear in detachable driving relation with the traction wheel and contained within the two-section oil cup, and a dust plate supported upon the inner flange in the opening in the said brake drum.

7. In an assembly for the purpose specified, the combination of a dead axle, a traction wheel rotatably supported upon the dead axle and provided with a brake drum, a supporting member provided with a sleeve fitting over the dead axle and having an outer flange and an inner flange, the inner flange provided with a bearing opening, a jack shaft rotatably supported in the bearing opening and having a driving pinion in its end, a two-section oil cup supported by the outer flange, a driven gear in removable driving relation with the driving pinion and contained in the two-section oil cup, a dust plate supported by the inner flange and filling the opening in the brake drum, and an internal brake contained within the housing formed by the brake drum and the dust plate and on the inside of the said two-section oil cup.

8. In an assembly for the purpose specified, the combination of a dead axle, a traction wheel rotatably supported upon the end of the dead axle and having a brake drum attached, a supporting member having a sleeve fitting onto the dead axle and provided with inner and outer flanges, the inner flange containing a bearing opening, a jack shaft rotatably supported in the bearing opening, a two-section oil cup secured to the outer flange, a driven gear in detachable driving relation with the said traction wheel, a pinion on the end of the jack shaft meshing with the teeth of the driven gear, a dust plate supported on the inner flange and filling the opening in the brake drum, an internal brake contained between the dust plate and the oil cup, and operating connections for said internal brake supported through the said dust plate.

In testimony whereof I affix my signature.

SEZO HATASHITA.